United States Patent [19]

Vereecke

[11] Patent Number: 4,547,150
[45] Date of Patent: Oct. 15, 1985

[54] CONTROL SYSTEM FOR OXYGEN ENRICHED AIR BURNER

[75] Inventor: Frank J. Vereecke, Palmyra, Mich.

[73] Assignee: Midland-Ross Corporation, Cleveland, Ohio

[21] Appl. No.: 608,722

[22] Filed: May 10, 1984

[51] Int. Cl.$^4$ ............................................. F23D 13/00
[52] U.S. Cl. ....................................... 432/12; 431/12; 431/75; 431/63
[58] Field of Search ............... 431/2, 12, 18, 62, 63, 431/75, 76, 4, 10; 432/23, 24, 12

[56] References Cited

U.S. PATENT DOCUMENTS

| | | | |
|---|---|---|---|
| 1,325,116 | 12/1919 | Sebille | 431/12 |
| 3,345,846 | 10/1967 | Hess | 432/12 |
| 3,733,165 | 5/1973 | Nakagawa et al. | 431/10 |
| 3,894,834 | 7/1975 | Estes | 431/12 |
| 4,017,253 | 4/1977 | Wielang et al. | 431/10 |
| 4,118,172 | 10/1978 | Noir et al. | 431/12 |

Primary Examiner—Carroll B. Dority, Jr.
Attorney, Agent, or Firm—H. Duane Switzer

[57] ABSTRACT

A combustion controller (C) controls the relative rates at which a combustion component source (B) supplies fuel, air, and oxygen to nozzles (A). A fuel source (30) supplies fuel to the burners at a rate (50 in FIG. 2) which is appropriate to produce a desired amount of heat. A blower (32) supplies air at a fixed rate (52b) and an oxygen source supplies oxygen gas at a rate (54) in proportion to the fuel supply rate such that stoichiometrically balanced combustion is maintained. To decrease the combustion rate, the air supply rate remains constant (52b) as the fuel and oxygen rich gas supply rates are decreased. After the oxygen rich gas supply rate reaches zero, the combustion rate is further reduced by decreasing the fuel supply rate and the air supply rate (52a) in stoichiometric proportion. In this manner, a relatively high nozzle velocity is maintained over a wide range of combustion rates.

10 Claims, 4 Drawing Figures

CONTROL SYSTEM FOR OXYGEN ENRICHED AIR BURNER

BACKGROUND OF THE INVENTION

The present invention relates to the art of combustion control and combustion control systems. The present invention finds particular application in an apparatus and method for controlling the temperature in a batch-loaded furnace heated with oxygen enriched air burners and will be described with particular reference thereto. It is to be appreciated, however, that the invention is applicable to the control of other types of furnaces and finds use for oxygen enriched air combustion systems which operate over a wide range of heat output rates.

Heretofore, combustion rates and furnace temperatures have been controlled by increasing and decreasing both air and fuel flow rates in a fixed, stoichiometric ratio. For example, air was commonly supplied to the combustion nozzle or burner at 9.41 times the supply rate of Toledo natural gas. As more calories of heat were required, the fuel and air supply rates were both increased while maintaining the 9.41:1 ratio. Similarly, when less heat was required, both flow rates were reduced in this fixed proportion.

For some applications, it has been found to be advantageous to supply the burner with oxygen enriched air to substantially improve the furnace efficiency. That is, oxygen gas has been mixed with the air to increase its natural 21% oxygen concentration to a higher level, e.g., 45%. The stoichiometric combustion ratio for oxygen-enriched air with a 45% oxygen concentration and Toledo natural gas is 4.34:1. To increase or decrease the combustion rate, the supply of fuel and the supply of oxygen-enriched air were increased or deceased, respectively, together such that the stoichiometric combustion ratio remained constant over all combustion levels.

One of the problems encountered with the prior art combustion control systems was that at low heat inputs, there were correspondingly low flow rates of air or enriched air and fuel supplied to the burner. These low flow rates resulted in a lazy, low velocity flame which lacked sufficient momentum to distribute the heat uniformly. A wide variation in the combustion rate produced correspondingly wide variations in combustion momentum, hence in temperature distributions. Prior art furnaces which were operated at near 100% combustion capacity to bring the treated objects up to temperature and at a relatively low percent of capacity to maintain the temperature were susceptible to temperature gradients at the lower combustion rates.

Further, the prior art combustion control systems experienced more difficulty controlling combustion rates at low percentages of capacity. At relatively low combustion levels, the air and fuel pressures were relatively low, rendering precise control elusive.

The present invention contemplates a new and improved control system for oxygen-enriched burners which overcomes the above-referenced problems and others.

SUMMARY OF THE INVENTION

In accordance with the present invention, a method of controlling combustion is provided wherein fuel, oxygen, and air are supplied to the burner at selectively variable rates relative to each other. Over the majority of the burner capacity, the heat output of the burner is increased by increasing the fuel and oxygen supply rates while maintaining the air supply rate substantially constant. Similarly, heat output from the burner is decreased by decreasing the fuel and oxygen supply rates proportionally while maintaining the air supply rate substantially constant. Because the air supply rate is significantly higher than either the oxygen or gas supply rate, relatively high and constant combustion momentum is maintained.

In accordance with a more limited aspect of the invention, at low percentages of capacity, no oxygen is supplied and the air supply rate and fuel supply rate are varied generally in a stoichiometrically balanced ratio.

In accordance with another aspect of the present invention, an apparatus for controlling combustion is provided. A fuel supply means supplies fuel to a burner at a selectively variable rate; an oxygen supply means supplies oxygen to the burner at a selectively variable rate; and, an air supply means supplies air to the burner at a selectable rate. A heat output control means selectively increases the heat output from the burner by increasing the fuel and oxygen supply rates in a stoichiometrically balanced ratio while maintaining the air supply rate constant, and selectively decreases the burner heat output by decreasing the fuel and oxygen supply rates and maintaining the air supply rate substantially constant.

One advantage of the present invention is that it maintains high combustion momentum and velocity over a wide range of combustion rates.

Another advantage resides in an increase in furnace temperature uniformity.

Yet another advantage of the invention is that it more accurately controls combustion rates at lower percentages of the maximum combustion capacity.

Still further advantages of the invention will become apparent to those of ordinary skill in the art upon a reading and understanding of the following detailed description of the preferred embodiment.

BRIEF DESCRIPTION OF THE DRAWINGS

The invention may take form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
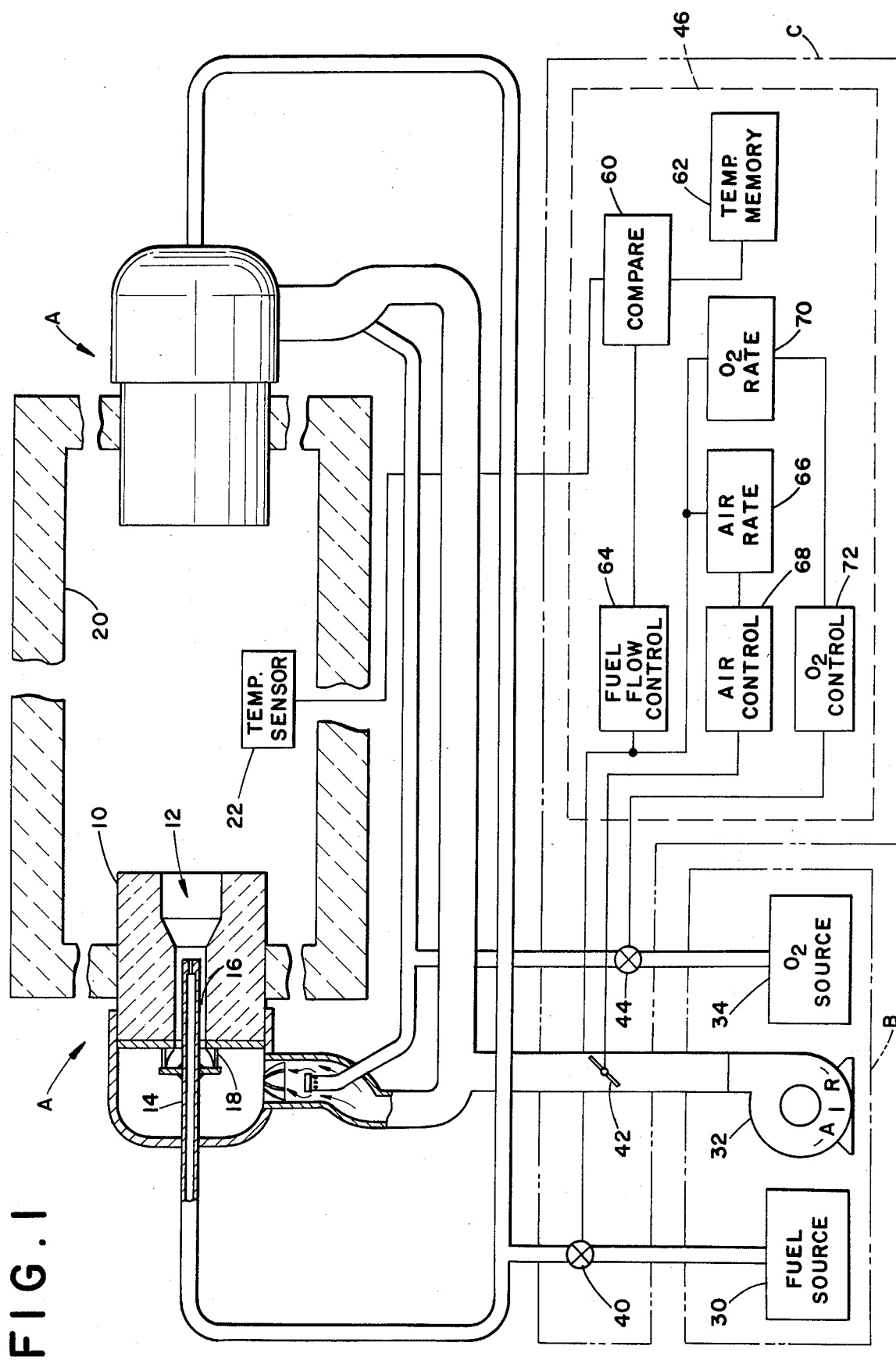
FIG. 1 is a diagrammatic illustration of a combustion furnace in combination with the control device formed in accordance with the present invention.

Referring now to the drawings wherein the showings are for purposes of illustrating a preferred embodiment of the invention only and not for purposes of limiting same, FIG. 1 shows the combustion system of the present invention as including one or more combustion nozzles or burners A which combust or oxidize fuel in enriched air from a combustion component supply means B. A combustion controller C controls the rate at which fuel, air, and oxygen are supplied to the nozzle for controlling the combustion rate and the calories of heat put out by the combustion nozzle.

Each nozzle or burner A includes a ceramic combustion block 10 which defines a flared throat 12 in the furnace facing end thereof. A fuel conveying channel 14 and an enriched air conveying channel 16 extend concentrically through the combustion block and terminate adjacent the flared throat 12. Air directing vanes 18 impart a swirling motion to the enriched air as it enters the enriched air channel 16 to assist in intermixing the fuel and enriched air during combustion. One or more of the nozzles A are mounted within a furnace 20 which is to be heated thereby, and a temperature sensing means 22 is mounted within the furnace to sense the temperature therein.

With continuing reference to FIG. 1, the combustion component supplying means B includes a source of fuel 30 for supplying fuel to be combusted. In the preferred embodiment, the fuel source comprises a source of natural gas, although fuel oil, coal slurries, and the like, are also contemplated. The combustion component supplying means further includes an atmospheric air supply means 32 such as a blower or fan for pumping ambient atmospheric air to the nozzles. The ambient air flow is selectively enriched by a source of oxygen gas such as an oxygen concentrator which separates oxygen from atmospheric air, bottles of compressed oxygen gas, or the like. It is to be appreciated that the oxygen supply means need not supply substantially pure oxygen gas. Rather, it may supply a gas of any known or controllable oxygen concentration which exceeds the 21% oxygen concentration of atmospheric air. Optionally, a source of combustion inert gas, such as hot exhaust gases, may also be supplied for maintaining combustion momentum without affecting the stoichiometric balance.

The combustion control means C includes fuel supply or flow rate regulating means 40, such as a servovalve, for regulating the rate at which fuel is supplied to the nozzle. An air rate regulating means 42, such as a baffle, and an oxygen rate regulating means 44, such as a regulator valve, regulate the rate at which oxygen and combustion inert gases are supplied to the nozzles. An electronic control circuit 46 regulates the flow rate through the fuel, air, and oxygen regulating means in accordance with the temperature sensed by the temperature sensor 22, or other temperature or combustion rate selection input.

Figure 2:
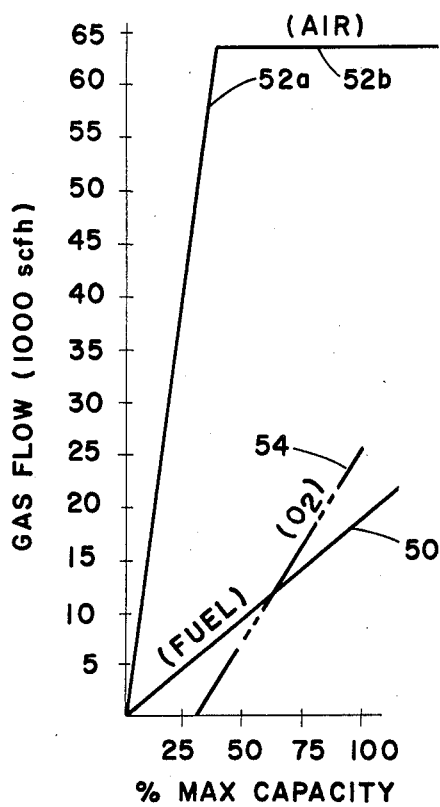
FIG. 2 illustrates relative supply rates of fuel, air, and oxygen versus percent of maximum burner capacity in accordance with the present invention.

With reference to FIG. 2, the combustion control means C controls the relative flow rates of fuel, air, and oxygen such that a stoichiometrically balanced combustion condition is maintained at the nozzle over the full range combustion capacities. As illustrated by line 50, the fuel is supplied at a selectively variable rate varying from zero at 0% of the maximum combustion capacity to a maximum flow rate at 100% of the nozzle capacity. Although the fuel supply rate is illustrated as varying linearly between its minimum and maximum supply rates, the present invention is not so limited.

As illustrated by curve segment 52a, the supply rate of atmospheric air varies between a minimum or zero supply rate and a steady state supply rate in a fixed stiochiometric ratio with the fuel supply rate. From a preselected percentage through 100% of the maximum combustion capacity, the air supply rate remains constant as illustrated by curve segment 52b which is generally at the maximum air flow rate for which the nozzles are designed or rated. Below the preselected percentage of the combustion capacity, 30% in the illustrated embodiment, the fuel and air are supplied in a balanced, stiochiometric ratio. In the case of Toledo natural gas and air, air is supplied at 9.41 times the natural gas supply rate. Above the preselected percent combustion capacity, the air is supplied at steady state supply rate 52b. Supplying the air at the fixed, steady state supply rate provides an oxygen shortfall in the stoichiometric balance.

As illustrated by line 54 in FIG. 2, the oxygen regulating means 44 supplies oxygen at an appropriate rate to compensate for the shortfall and maintain the combustion in stoichiometric balance. The supplying of oxygen starts at the same percentage of combustion capacity as the air supply rate levels off at the steady state supply rate 52b.

Figure 3:
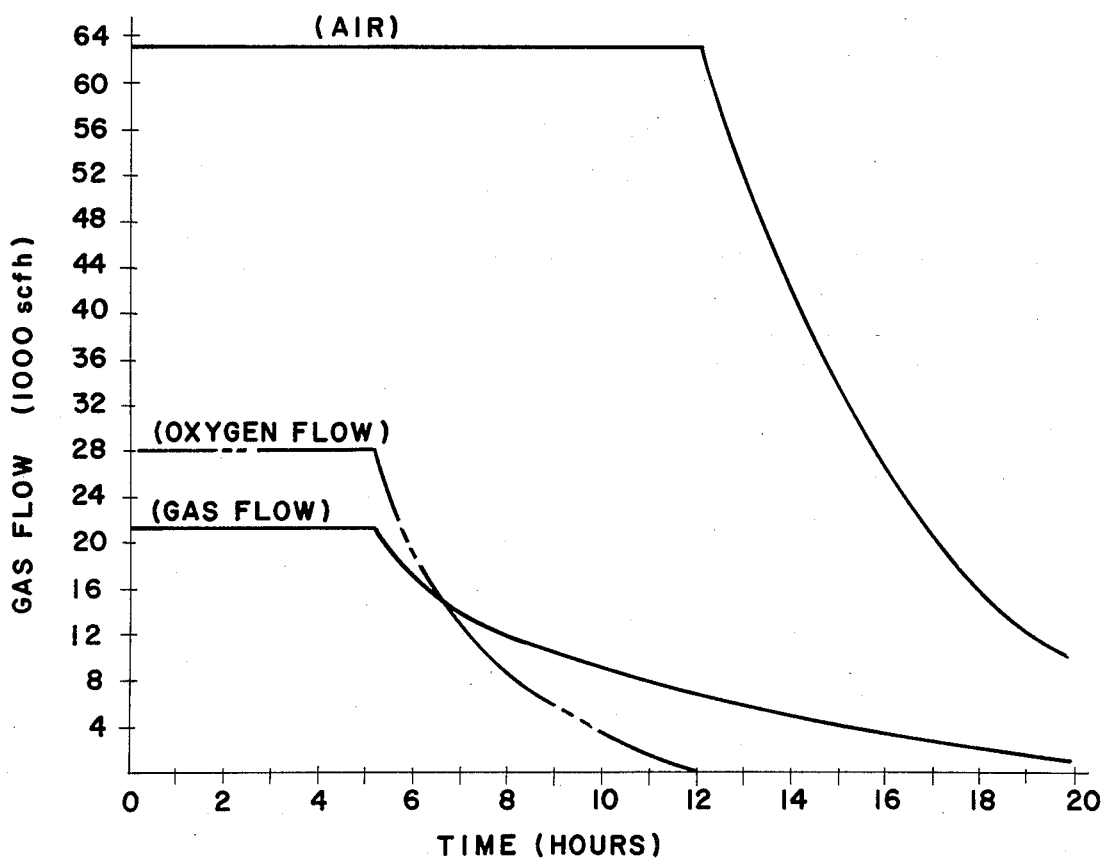
FIG. 3 illustrates relative supply rates of air, oxygen, and fuel versus time for a typical soaking cycle; and, FIG. 4 illustrates burner pressure versus burner capacity.

In FIG. 3, the relative supply rates of fuel, air, and oxygen for a typical 20 hour heat cycle are illustrated. When the cold workpieces which are to be heat treated are placed in the furnace, full firing is required for some length of time to supply the calories necessary to heat the workpieces to the furnace set point, e.g., in the range of 2200°–2400° F. In the illustrated embodiment, gas is supplied at about 22,000 cubic feet per hour, oxygen at about 28,000 cubic feet per hour and air at about 63,000 cubic feet per hour until the set point is attained at about 5 hours into the cycle. During the maximum combustion rate, i.e., the first 5 or so hours, oxygen is supplied at an appropriate rate to raise the oxygen percentage in the nozzle to about 45% of the oxygen enriched air.

Having heated the workpieces substantially to the set point, less additional heat is required to maintain the set point temperature. Accordingly, after the set point is attained, fewer calories of heat are put into the system each hour. The air flow rate stays constant, and the gas and oxygen are supplied increasingly more slowly but in the appropriate ratio to maintain the combustion stoichiometrically balanced. At about 12 hours into the illustrated cycle, the oxygen flow reaches 0. During hours 5 through 12, as the gas and oxygen supply rates decrease in a stoichiometrically balanced relationship, the percentage of oxygen in the enriched air progressively decreases from about 45% to about 21%. After the 12th hour, when progressively less heat is required, the fuel supply rate is decreased still further. To maintain the stoichiometric balance, the air supply rate is decreased in proportion to the fuel supply rate.

Nitrogen from the atmospheric air does not react during the combustion process but rather, absorbs heat and reduces the amount of available heat for the furnace and the workpieces. As the percentage of nitrogen decreases with an increasing percentage of oxygen, the nozzle produces more usable heat for a given amount of fuel. In FIG. 3, the 22,000 cubic feet per hour natural gas flow rate produces about 22 MM Btu/hr., which is the "gross input" to the system. Various losses reduce the gross input to about 13 MM Btu/hr. of "net input". To attain the same net input of 13 MM Btu/hr. using only nonoxygen-enriched air requires a gross input of 36 MM Btu/hr. to compensate for the extra heat loss to the nitrogen and the like. Thus, a net savings in fuel is achieved by using the oxygen-enriched gas flow. At lower fuel supply rates, the fuel savings achieved by adding oxygen are also less. However, the cost of oxygen is also significant and tends to offset the value of the fuel savings. The present invention effects a cost savings by decreasing the amount of supplemental oxygen supplied as the fuel supply rate decreasese.

Figure 4:
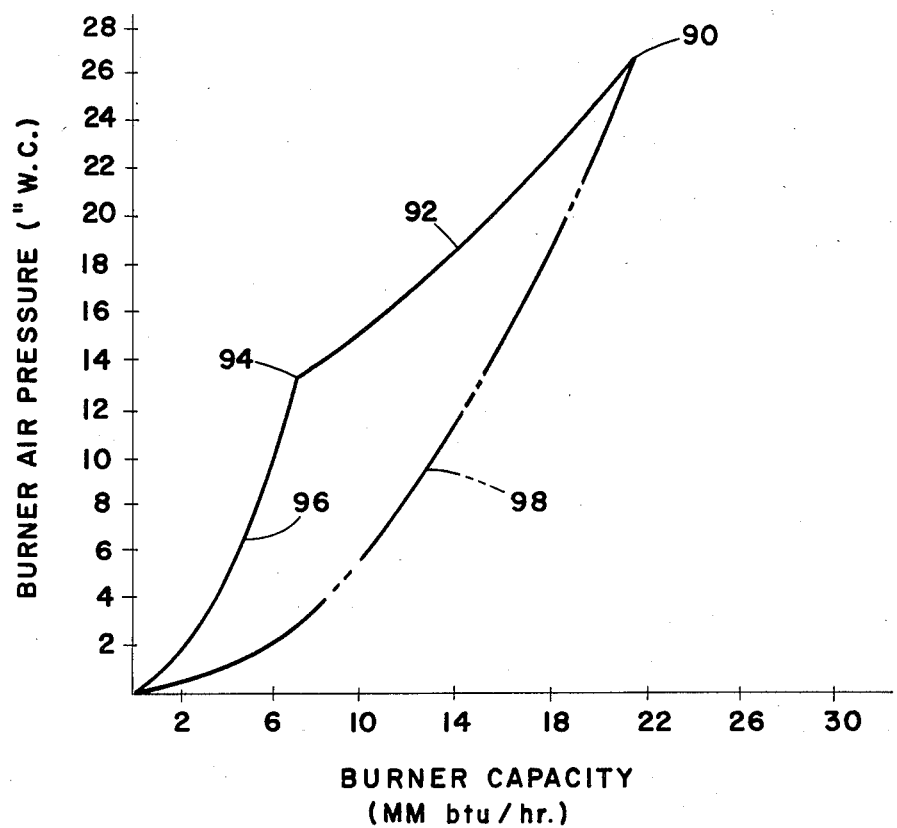

With reference to the example illustrated in FIG. 4, the pressure of air and oxygen at the nozzle reaches an apex 90 at a combustion rate of about 22 MM Btu/hr. As illustrated by curve 92, the enriched air pressure decreases as the amount of heat is decreased by reducing the oxygen and fuel supply rates. The oxygen supply rate reaches zero at point 94, and thereafter, the fuel and air supply rates are cut back to reduce the heat output. The reduction of the air supply rate from the steady state level causes the nozzle pressure to drop off much more rapidly as is illustrated by curve 96. By way of comparison, phantom curve 98 illustrates the corresponding nozzle pressure drop off which a conventional oxygen-enriched burner undergoes when the oxygen concentration is held constant at about 45%. As will be appreciated from FIG. 4, the present invention provides a significantly higher nozzle pressure at virtually all heat production rates. This higher nozzle pressure increases combustion momentum which, in turn, increases heat distribution throughout the furnace. Further, regulation of burner heat, particularly the flow rate of the combustion components, is easier and more precise at higher flow rates.

Referring again to FIG. 1, the exemplary electronic control 46 for implementing the above-discussed control method includes a comparing means 60 for comparing the temperature sensed by a temperature sensor 22 with a selected or set point temperature stored in a temperature memory 62. The temperature memory may store set point temperature as a function of heating cycle time such that the furnace temperature is varied during the cycle. The comparing means 60 increments or decrements a fuel regulator valve electrical control means 64 which adjusts the fuel regulator valve 40 to increase or decrease the fuel supplying rate in accordance with the comparison. Further, the electronic designation of the fuel supply rate is utilized as an input by an air supply rate selecting means 66 to determine the appropriate air flow rate which corresponds to the selected fuel supply rate.

An air regulator valve control means 68 causes the air flow regulating means 42 to supply air at the selected rate. Various air selecting rate means may be utilized. For example, the air rate selecting means may be a read-only memory which is addressed by the fuel flow rate to retrieve the corresponding one of a plurality of air supply rates which have been preprogrammed in accordance with FIG. 2.

An oxygen rate selecting means 70 derives the appropriate oxygen supply rate in accordance with FIG. 2 for the selected fuel and air supply rates. An oxygen regulator valve controlling means 72 causes the oxygen regulator means 44 to pass the selected flow rate of oxygen. The oxygen rate selecting means may also be a read-only memory which is addressed by the fuel rate and retrieves the corresponding oxygen supply rate as indicated by FIG. 2. Optionally, the control circuit may be implemented with a computer programmed to make the above-discussed control logic or the equivalent.

The invention has been described with reference to the preferred embodiment. Obviously, modifications and alterations will occur to others upon a reading and understanding of the preceding detailed description. It is intended to include all such modifications and alterations insofar as they come within the scope of the appended claims or the equivalents thereof.

Having thus described the invention, it is now claimed:

1. A method of heat treating workpieces comprising:
   (a) placing the workpieces to be heat treated in a furnace;
   (b) supplying fuel, air, and oxygen rich gas to a burner communicating with the furnace at generally constant fuel, air, and oxygen rich gas supply rates until the furnace reaches a preselected set point temperature;
   (c) decreasing the fuel and oxygen rich gas supply rates after the furnace reaches the preselected set point temperature without decreasing the air supply rate such that the relative fuel, oxygen rich gas, and air supply rates maintain a generally stoichiometrically balanced combustion relationship; and,
   (d) continuing decreasing the fuel supply rate and commencing decreasing the air supply rate after decreasing the oxygen rich gas supply rate to a preselected minimum oxygen rich gas supply rate in such a manner that the combustion remains substantially stoichiometrically balanced.

2. The method as set forth in claim 1 wherein said preselected minimum oxygen rich gas supply rate is zero.

3. The method as set forth in claim 1 wherein the oxygen rich gas is more than 21% oxygen.

4. The method as set forth in claim 1 wherein the oxygen rich gas is at least 65% oxygen.

5. The method as set forth in claim 4 wherein the fuel comprises natural gas.

6. A combustion apparatus comprising:
   (a) means for defining a heating chamber;
   (b) at least one burner nozzle disposed in communication with the heating chamber for supplying heat thereto;
   (c) a fuel source for supplying fuel to the nozzle;
   (d) air supplying means for supplying air to the nozzle;
   (e) an oxygen rich gas source for supplying oxygen rich gas to the nozzle;
   (f) fuel regulating means operatively associated with the fuel source for regulating the rate at which fuel is supplied to the nozzle;
   (g) air regulating means operatively associated with the air supplying means for regulating the rate at which air is supplied to the nozzle;
   (h) oxygen rich gas regulating means operatively associated with the oxygen rich gas source for regulating the rate at which the oxygen rich gas is supplied to the nozzle; and,
   (i) a combustion component control circuit for controlling the fuel, air, and oxygen regulating means such that above a preselected combustion rate, air is supplied at a generally constant rate, fuel is supplied at an appropriate variable rate to maintain a preselected temperature within the heating chamber, and oxygen rich gas is supplied at an appropriate variable rate to maintain combustion substantially in stoichiometric balance.

7. The apparatus as set forth in claim 6 further including temperature sensing means operatively connected with the control circuit for sensing temperature in the heating chamber.

8. The apparatus as set forth in claim 7 wherein the control circuit includes means for comparing the temperature sensed by the temperature sensing means with at least one preselected temperature, the comparing means being operatively connected with the fuel supply rate regulating means such that the fuel supply rate is adjusted in accordance with the comparison between the sensed and preselected temperatures.

9. The apparatus as set forth in claim 6 wherein the control circuit further includes an air supply rate controlling means for causing the air regulating means to supply air at a preselected constant rate above the preselected combustion rate and in a stoichiometrically balanced relationship with the fuel supply rate below the preselected combustion rate.

10. The apparatus as set forth in claim 6 wherein the control circuit further includes an oxygen rich gas supply rate controlling means for causing the oxygen rich gas regulating means to terminate the supply of oxygen rich gas below the preselected combustion rate and to supply oxygen rich gas in a fixed proportion to the fuel supply rate above the preselected combustion rate.

* * * * *